US012168308B2

(12) United States Patent
Vesterinen et al.

(10) Patent No.: US 12,168,308 B2
(45) Date of Patent: Dec. 17, 2024

(54) VENEER LATHE AND METHOD OF PRODUCING VENEER

(71) Applicant: RAUTE OYJ, Nastola (FI)

(72) Inventors: Mikko Vesterinen, Vääksy (FI); Jussi Auvinen, Lahti (FI); Ilpo Lyytikäinen, Nastola (FI); Timo Nietosvuori, Lahti (FI); Antti Pennanen, Lahti (FI); Matti Poikela, Lahti (FI); Seppo Vartiainen, Villähde (FI)

(73) Assignee: RAUTE OYJ, Nastola (FI)

( * ) Notice: Subject to any disclaimer, the term of this patent is extended or adjusted under 35 U.S.C. 154(b) by 450 days.

(21) Appl. No.: 17/613,283

(22) PCT Filed: May 13, 2020

(86) PCT No.: PCT/FI2020/050319
§ 371 (c)(1),
(2) Date: Nov. 22, 2021

(87) PCT Pub. No.: WO2020/240078
PCT Pub. Date: Dec. 3, 2020

(65) Prior Publication Data
US 2022/0219351 A1 Jul. 14, 2022

(30) Foreign Application Priority Data
May 24, 2019 (FI) ..................................... 20195436

(51) Int. Cl.
*B27L 5/02* (2006.01)
*B27L 5/00* (2006.01)

(52) U.S. Cl.
CPC ............... *B27L 5/022* (2013.01); *B27L 5/006* (2013.01); *B27L 5/025* (2013.01)

(58) Field of Classification Search
CPC .. B27L 5/02; B27L 5/022; B27L 5/025; B27L 5/027
See application file for complete search history.

(56) References Cited

U.S. PATENT DOCUMENTS 4,454,900 A 6/1984 Hayes
4,549,587 A 10/1985 Hasegawa et al.
(Continued)

FOREIGN PATENT DOCUMENTS

CA 1157748 A 11/1983
EP 1837146 A1 9/2007

OTHER PUBLICATIONS

International Search Report and Written Opinion mailed Aug. 26, 2020 in PCT/FI2020/050319 (17 pages).
(Continued)

*Primary Examiner* — Matthew Katcoff
(74) *Attorney, Agent, or Firm* — Meunier Carlin & Curfman LLC

(57) ABSTRACT

The veneer lathe comprises rotatable spindles for engaging the ends of a block, a centering device for measuring dimensions of the block for determining optimal centering of the block, the centering device comprising centering spindles for engaging each end of the block, transfer arms moveable in the axial direction of the spindles for engaging the ends of the block and in a direction that is perpendicular to the axial direction for transferring the block from the centering device to a peeling position, a knife assembly comprising a knife and a nose bar, which is in the form of a rotatable roll, and a support device comprising a lower roll and an upper roll at a distance from the lower roll for supporting the block during peeling.

17 Claims, 6 Drawing Sheets

(56) References Cited

U.S. PATENT DOCUMENTS

| | | | | |
|---|---|---|---|---|
| 5,449,030 | A * | 9/1995 | Mutsuura | B23Q 15/22<br>144/365 |
| 5,518,052 | A | 5/1996 | Westberg et al. | |
| 5,971,045 | A * | 10/1999 | Watanabe | B27L 5/025<br>144/365 |
| 6,116,306 | A | 9/2000 | Ely | |
| 9,597,817 | B2 * | 3/2017 | Dezellem | B27L 5/02 |
| 2012/0199247 | A1 | 8/2012 | Runonen | |

OTHER PUBLICATIONS

Finnish Search Report dated Dec. 28, 2019 in FI Application No. 20195436 (2 pages).

* cited by examiner

VENEER LATHE AND METHOD OF PRODUCING VENEER

CROSS REFERENCE TO RELATED APPLICATIONS

This application is a United States National Phase Patent Application of International Patent Application Number PCT/FI2020/050319, filed on May 13, 2020, which claims the benefit of priority to Finnish Application No. 20195436, filed May 24, 2019, the contents of which are incorporated by reference herein in their entireties.

TECHNICAL FIELD OF THE INVENTION

The present invention relates to a veneer lathe in accordance with claim 1. The invention also concerns a method of producing veneer as defined in the other independent claim.

BACKGROUND OF THE INVENTION

Veneer can be produced from wood either by slicing by means of a veneer slicer or by peeling by means of a lathe. In peeling, a block, i.e. a relatively round log of wood is brought into the lathe, where it is rotated and a knife cuts veneer from the surface of the block. There are two basic types of peeling methods that are commonly used in the veneer production. In spindle peeling, each end of a block is engaged by means of a spindle. The spindles transmit to the block the torque needed for rotating the block and also keep the rotation center of the block stationary. An additional torque may be produced by additional means via the outer perimeter of the block. In spindleless peeling, the block is rotated solely by means that are engaged with the outer perimeter of the block.

Before the actual peeling, the blocks are rounded. In spindle peeling, the block is typically engaged with the spindles before the rounding and the actual peeling starts after the rounding without moving the position of the block between the spindles. The rounding is done by means of a knife without contacting the block by a pressure bar or a roller nose bar. Also in spindleless peeling, it is possible to use the same knife for both the rounding and peeling, but this reduces the capacity of the lathe and therefore a separate rounding machine is often used for the rounding. The use of a separate rounding machine also saves the knife of the lathe from wear.

SUMMARY OF THE INVENTION

An object of the present invention is to provide an improved veneer lathe, which can be used for producing veneer from blocks by peeling and which allows both spindle peeling and spindleless peeling. The characterizing features of the lathe according to the invention are given in claim 1. Another object of the invention is to provide an improved method of producing veneer from a block by peeling.

The veneer lathe according to the invention comprises a first set of spindles comprising at least one spindle that is moveable in the axial direction of the spindle for engaging a first end of a block and a second set of spindles comprising at least one spindle that is moveable in the axial direction of the spindle for engaging a second end of the block, the spindles being rotatable and configured to hold the block in a peeling position in spindle peeling and to transmit to the block torque needed for rotating the block, a centering device, which is configured to measure dimensions of the block for determining optimal centering of the block between the first set of spindles and the second set of spindles in spindle peeling, the centering device comprising a first centering spindle that is moveable in its axial direction for engaging the first end of the block and a second centering spindle that is moveable in its axial direction for engaging the second end of the block, a first transfer arm that is moveable in the axial direction of the spindles for engaging the first end of the block and a second transfer arm that is moveable in the axial direction of the spindles for engaging the second end of the block, the transfer arms being further configured to be moveable in a direction that is perpendicular to the axial direction of the spindles for transferring the block from the centering device to the peeling position for spindle peeling, a knife assembly that is moveable in a direction that is perpendicular to the axial direction of the spindles and comprises a knife for cutting the veneer and a nose bar, which is in the form of a rotatable roll, and a support device comprising a rotatable lower roll and a rotatable upper roll, which is arranged at a distance from the lower roll in a radial direction of the lower roll, the rolls being configured to support the block during peeling.

In the method according to the invention, veneer is produced from a block using a lathe defined above by bringing a block to the lathe, rotating the block in the lathe, and peeling veneer from the block by means of the knife.

The lathe according to the invention allows selection of the most suitable peeling method or a combination of the methods for each block. For instance, the peeling can be started using the spindles and as the diameter of the block approaches the diameter of the spindles, a transition to spindleless peeling can be done. Because of the rotatable roll, i.e. a roller nose bar that is used as a nose bar, and the two supporting rolls, spindleless peeling and the transition from spindle peeling to spindleless peeling can be effectively controlled without a need to use spiked discs for providing driving torque and for positioning the block.

According to an embodiment of the invention, the first centering spindle and the second centering spindle are movable independently from each other in a first direction that is perpendicular to the axial direction of the centering spindles and in a second direction that is perpendicular to the axial direction of the centering spindles and to the first direction for allowing centering of the block before transferring the block to the peeling position for spindle peeling. This allows the block to be correctly positioned before it is gripped by the transfer arms. The block can thus be centered simultaneously as a previous block is being peeled. Also, the transfer arms can be configured to move synchronized along a fixed path, which allows a simple construction.

According to an embodiment of the invention, the first transfer arm and the second transfer arm are configured to move linearly for transferring the block from the centering spindles of the centering device to the peeling position. This makes the construction of the moving mechanism of the transfer arms simple.

According to an embodiment of the invention, the moving direction of the transfer arms is inclined 10-20 degrees from the vertical direction towards the centering device. The transfer arms thus move from the peeling position upwards and towards the centering spindles. Therefore, the centering spindles are required to move over a shorter distance from a position where the block is measured to a position where the block is gripped by means of the transfer arms. This shortens the time that is needed for starting the peeling of a block after the termination of the peeling of a previous block. On the other hand, because the moving direction is only slightly inclined relative to the vertical direction, the support device does not need to be moved backwards over a long distance. Also this allows a quick changing of the block to be peeled.

According to an embodiment of the invention, the support device is configured to be moveable linearly in a direction that is at an angle of 3-7 degrees relative to the horizontal direction so that the support device descents as it moves towards the spindles. This provides good support for the block but does not make the construction of the lathe too high. Also, the distance from the rolls to the knife and the nose bar is maximized.

According to an embodiment of the invention, the distance between the lower roll and the upper roll of the support device is fixed and the rolls form an assembly that is configured to be rotatable about the rotation axis of the upper roll. During peeling, the diameter of the block decreases spirally, and by rotating the roll assembly, this effect can be compensated and the rotation axis of the block can be kept stationary.

According to an embodiment of the invention, the lathe comprises an electrically driven linear actuator for moving each spindle in the axial direction of the spindle. With an electrically driven linear actuator, less space is needed in the axial direction of the lathe compared to hydraulic actuation of the spindles. Also the control of the axial movement of the spindles and the energy efficiency are better than in conventional solutions with hydraulic cylinders. Because of the better control of the axial movement, shorter stroke is required when a block is replaced by a new block, and the changeover time is thus shortened compared to hydraulic solutions. Electrically driven linear actuators also allow longer stroke of the spindles, which allows greater variation in the length of the blocks.

According to an embodiment of the invention, the lathe comprises an electrically driven linear actuator for moving each centering spindle in the axial direction of the centering spindle. This allows similar benefits as in the case of the spindles used during peeling.

According to an embodiment of the invention, the lathe comprises one or more electric motors that are configured to drive the nose bar and the rolls of the support device.

According to an embodiment of the invention, the support device is provided with a feeder that is configured to transfer blocks to spindleless peeling without the use of the centering device and the transfer arms. By arranging the feeder in the support device, the feeder does not move in relation to the rolls of the support device and blocks can be fed by means of a simple construction into a peeling position between the rolls and the knife and the nose bar. The feeder allows rapid feeding of blocks to spindleless peeling. This feature can be used for feeding small rounded blocks.

According to an embodiment of the invention, the feeder comprises a rotatable feeder arm and an actuating device configured to actuate the feeder arm.

According to an embodiment of the invention, the method comprises the steps of determining dimensions of the block by means of the centering device, based on the dimensions of the block, centering the block into an optimal orientation, and transferring the block by means of the transfer arms to a peeling position between the spindles.

According to an embodiment of the invention, the method comprises the steps of rotating the block by means of the spindles and peeling the block until the block reaches a first predetermined diameter, retracting the spindles and continuing the peeling without the spindles until the block reaches a second predetermined diameter. The benefits of spindle peeling and spindleless peeling can thus be combined.

According to an embodiment of the invention, the block is positioned into an optimal orientation by means of the centering spindles of the centering device, and the block is transferred into a peeling position by means of a linear movement of the transfer arms. The block is thus correctly oriented before being transferred to the spindles, which allows simple construction of the transfer mechanism and quick changing of the block to be peeled.

According to an embodiment of the invention, the block is brought into a peeling position for spindleless peeling without the use of the centering spindles and the transfer arms. This allows faster feeding of small rounded logs.

According to an embodiment of the invention, an assembly comprising the lower roll and the upper roll is rotated about the rotation axis of the upper roll during peeling. During peeling, the diameter of the block decreases spirally, and by rotating the roll assembly, this effect can be compensated and the rotation axis of the block can be kept stationary.

According to an embodiment of the invention, the lower roll and the upper roll of the support device and the roller nose bar are electrically driven during peeling.

BRIEF DESCRIPTION OF THE DRAWINGS

Embodiments of the invention are described below in more detail with reference to the accompanying drawings, in which.

DESCRIPTION OF EMBODIMENTS OF THE INVENTION

Figure 1:
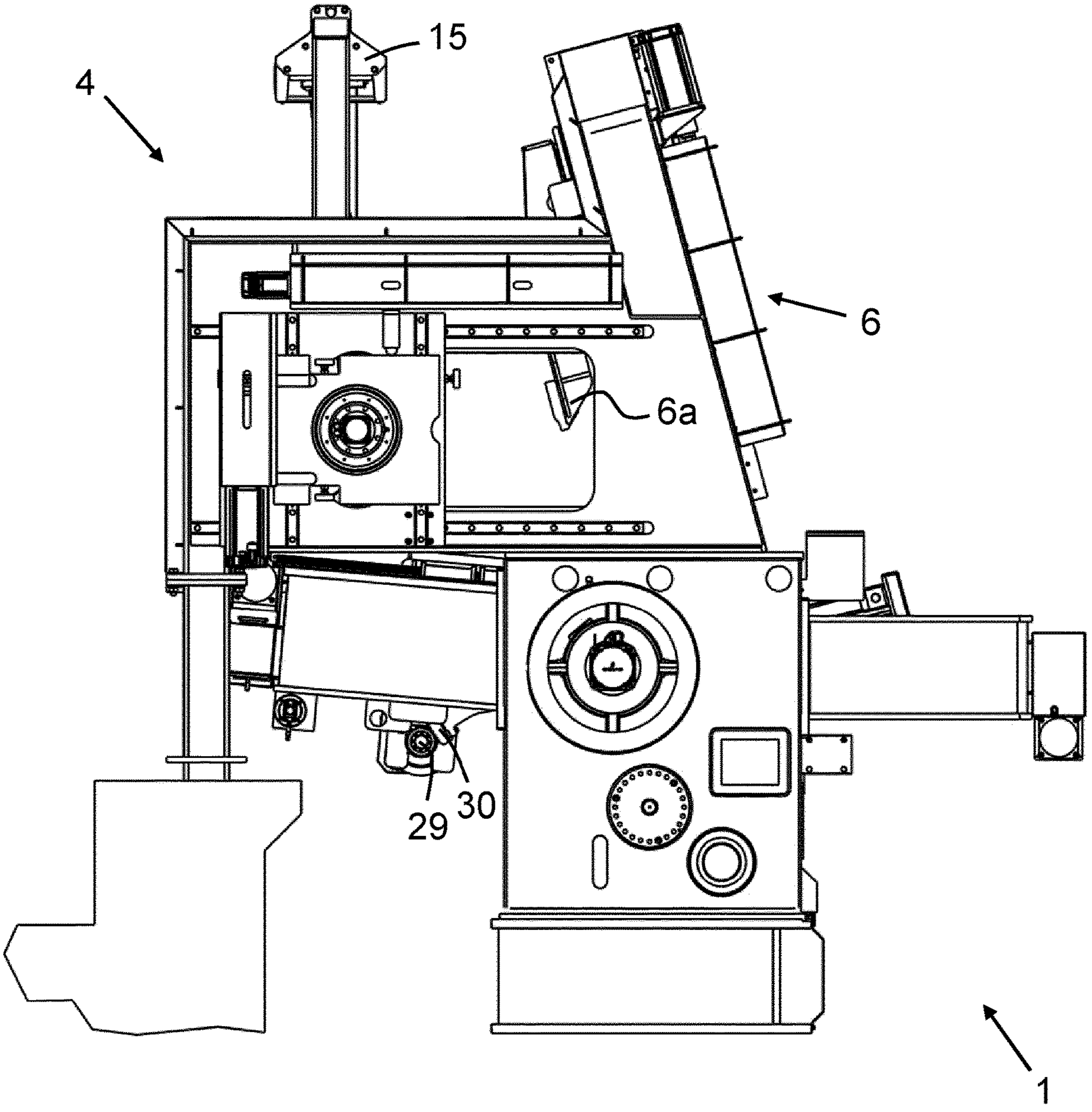
FIG. 1 shows a side view of a lathe according to an embodiment of the invention.

FIG. 1 shows a side view of a veneer lathe 1 according to an embodiment of the invention. The veneer lathe 1 is configured to produce veneer from wood blocks by peeling. The term "block" refers here to a relatively round piece of wood, i.e. a log. The term "peeling" refers here to a method, where a block is rotated about a longitudinal center axis and as the block rotates, a sharp tool cuts wood veneer from the surface of the block. The veneer lathe 1 according to the invention can be used for both spindle peeling and spindleless peeling. The term "spindle peeling" refers here to a method, in which a block is rotated between a pair of spindles. Each end of the block is thus engaged by means of a spindle. At least part of the torque needed for rotating the block is transmitted to the block via one of the spindles or via both spindles. However, also some additional means can be used for transmitting torque for rotating the block. The spindles also keep the rotation axis of the block stationary. The term "spindleless peeling" refers here to a method, where the ends of the block are not engaged by means of spindles. The ends of the block are thus free during the peeling. The torque needed for rotating the block is transmitted to the block via the outer perimeter of the block.

In spindle peeling, the block can be positioned in an optimal orientation for minimizing waste. The benefits of spindleless peeling include that the block can be peeled to a smaller diameter than in spindle peeling. Spindleless peeling also allows peeling of lower-quality blocks. A drawback is that usually a separate rounding step in a separate machine is needed for achieving a reasonable capacity.

Both above-mentioned peeling methods can be applied to a single block. Preferably, the peeling is started with spindle peeling, and when the diameter of the block reaches a first predetermined value, the peeling is continued as spindleless peeling until the diameter of the block reaches a second predetermined value. If the initial diameter of the block is below the first predetermined value, the block can be peeled using spindleless peeling only. Spindleless peeling can be used also in other kinds of cases. A block could also be peeled in the lathe 1 using spindle peeling only, although in that case the terminal diameter of the block after the peeling is greater and more waste is produced, unless the remaining core is used for other purposes.

In both above-mentioned peeling methods, the block is rotated in the lathe 1 and a knife cuts veneer from the surface of the block. The diameter of the block thus decreases spirally, until only a small diameter core is left. The core is removed from the lathe 1 and a new block is brought into a peeling position. The lathe 1 is configured to peel one block at a time. However, one or more blocks can be prepared for peeling at the same time as one block is being peeled.

As a natural material, the size and the properties of the blocks vary. For instance, the blocks are not perfectly symmetrical. Therefore, the actual peeling is usually preceded by a rounding step. Before rounding, the blocks are debarked, but often some bark is left after the debarking. The rounding also removes any remaining bark from the block. The rounding is made before the peeling regardless of whether spindle peeling or spindleless peeling is used. However, in spindle peeling, the block is typically engaged with the spindles before the rounding and the actual peeling starts after the rounding without moving the position of the block between the spindles. The rounding is done by means of the same knife as the peeling but without a nose bar. Also in spindleless peeling, it would be possible to use the same knife for both the rounding and peeling, but because this reduces the capacity of the lathe, a separate rounding machine is typically used for the rounding. The lathe 1 can thus receive both blocks that have been rounded in a separate machine and blocks that will be rounded in the lathe 1 prior to peeling.

The lathe 1 has an axial direction, which refers here to the axial direction of the spindles that support the block during spindle peeling. In FIG. 1, the axial direction is perpendicular to the plane of the drawing. The blocks are fed into the lathe 1 using auxiliary devices that are not shown in FIG. 1. In FIG. 1, the feeding direction is from the left to the right.

As has been described above, in spindle peeling the block is positioned between a pair of spindles. One spindle is engaged with each end of the block. The spindles position the block in its axial direction in the lathe 1 and hold the block stationary in the vertical and horizontal directions during peeling. Only rotational movement of the block is thus allowed. The spindles are movable in the axial direction of the lathe 1. The spindles also transmit to the block torque needed for the peeling. However, additional torque may be transmitted via other means, such as a support device or a roller nose bar. The lathe 1 may be provided with more than one spindle at each end. Typically, double or triple spindles, i.e. two or three spindles with different diameters are provided at each end. The spindles are arranged coaxially. The lathe 1 can be provided, for example, with outer and inner spindles or with outer, middle and inner spindles. The inner spindles have the smallest diameter and the outer spindles have the greatest diameter. The diameter of the outer spindles can be, for example, in the range of 90-220 mm and the diameter of the inner spindles can be, for example, in the range of 45-120 mm. The diameter of the outer spindles is preferably at least 50 percent greater than the diameter of the inner spindles. In the case of triple spindles, the diameter of the middle spindles is between the diameter of the inner spindles and the diameter of the outer spindles.

At the beginning of the peeling, the torque can be transmitted by means of outer spindles, and as the diameter of the block approaches the diameter of the outer spindles, the outer spindles are retracted, and the torque is transmitted by means of smaller diameter spindles. This allows transmission of greater torque at the beginning of the peeling and continuing the spindle peeling down to a smaller block diameter. However, in some cases it is desirable to start spindleless peeling before the diameter of the block is close to the diameter of the inner spindles.

In the embodiment of the figures, the lathe 1 comprises a first set of spindles, which are configured to engage a first end of the block and a second set of spindles, which are configured to engage a second end of the block. Each set of spindles comprises a linearly moveable spindle 3. A spindle 3 can be seen for example in FIGS. 2 and 5. As has been described above, each spindle 3 is configured the move linearly in the axial direction of the spindle 3. In the embodiment of the figures, the linear movement of the spindle 3 is implemented by means of an electrically driven linear actuator 31, which can be best seen in FIG. 6. The actuator 31 comprises an electric motor, such as a servomotor 10, which is configured to drive a ball screw 11, which is engaged with a nut 12. As the ball screw 11 is rotated by means of the motor 10, it moves the nut 12 and a bearing 13, which supports the spindle 3. The spindle 3 can thus be moved in its axial direction towards an end of a block for engaging the block. When the diameter of the block approaches the diameter of the spindle 3, the spindle 3 can be retracted by means of the motor 10.

Each spindle 3 is driven rotationally by a motor, which can be, for instance, an electric motor. The torque from the motor can be transmitted to the spindle 3 for example by means of a belt or chain.

Figure 7:
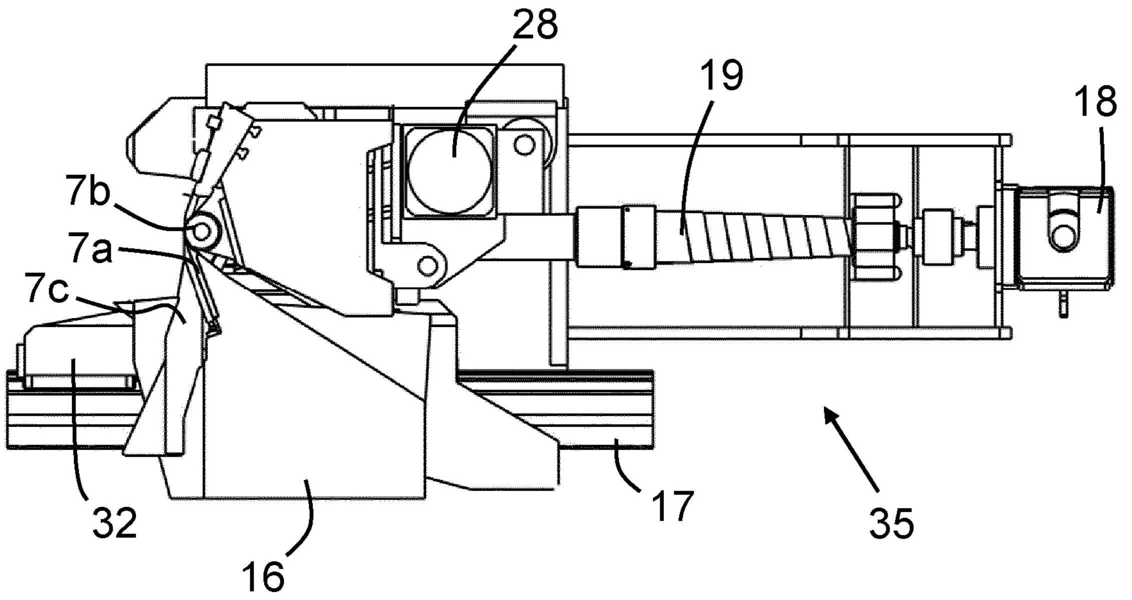
FIG. 7 shows a knife assembly of the lathe of FIG. 1.
Figure 8:
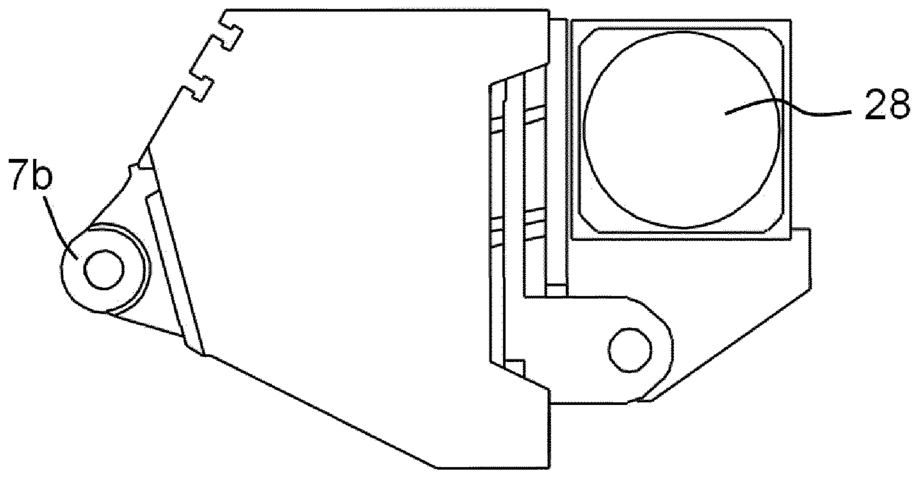
FIG. 8 shows a roller nose bar of the lathe of FIG. 1.

The veneer is cut from a block by means of a knife 7*a*. The knife 7*a* is an elongated plate extending in the axial direction of the spindles 3 and having a sharp edge for cutting the veneer. The knife 7*a* is arranged in a knife assembly 35. The knife assembly 35 is configured to move linearly. Parts of a knife assembly according to an embodiment of the invention can be seen for example in FIGS. 7, 9 and 10. In addition to the knife 7*a*, the knife assembly 35 comprises an end support 32 at each end of the knife assembly 35, a knife carriage body 16 and a nose bar 7*b*. The function of the nose bar 7*b* is to press the block 2 above the knife 7*a* for reducing variations of the thickness of the veneer and for reducing the number and depth of cracks on the inner surface of the veneer. In the lathe 1 according to the invention, the nose bar 7*b* is a rotating roll, and can be referred to as a roller nose bar. Non-rotating nose bars are often referred to as pressure bars. The moving direction of the knife assembly 35 is perpendicular to the axial direction of the spindles 3. In the embodiment of the figures, the moving direction of the knife assembly 35 is horizontal. The knife assembly 35 moves along guide rails 17. Each end support 32 of the knife assembly 35 is supported against a guide rail 17. The guide rails 17 or the end supports 32 of the knife assembly 35 can be provided with rolling elements. As the diameter of the block 2 decreases during peeling, the knife assembly 35 is moved forward to keep the knife 7*a* and the nose bar 7*b* in contact with the block 2. The lathe 1 is provided with electrically driven linear actuators 33 for moving the knife assembly. In the embodiment of the figures, the actuator 33 comprises an electric motor 18 and a ball screw 19.

The knife 7*a* is attached to the knife carriage body 16, which is supported by the end supports 32 of the knife assembly 35. Each end of the knife carriage body 16 is supported by means of bearings against an end support 32. The knife carriage body 16 can be rotated about a rotation axis that is parallel to the axial direction of the spindles 3. This allows adjustment of the clearance angle of the knife 7*a*. The term "clearance angle", which can also be referred to as a relief angle or pitch angle, refers to the angle between the flank of the knife 7*a* and the surface of the block 2 that is being peeled. The flank of the knife 7*a* is the surface facing the surface of the block 2. The knife carriage body 16 can be rotated by means of a hydraulic unit comprising a constant volume pump and an electric motor driving the pump. The rotation speed of the motor is adjusted by means of a frequency converter. The flow rate of the pump can thus be adjusted, which saves energy. By adjusting the clearance angle, the variations in the thickness of the veneer can be reduced and quality of the veneer can be controlled.

The nose bar 7*b* is attached to the knife carriage body 16. The nose bar 7*b* is a rotatable roll, i.e. a roller nose bar. The nose bar 7*b* is driven by means of an electric motor 28. A driven nose bar 7*b* helps achieving better control of the rotation speed and the position of the rotation axis of the block in spindleless peeling. The nose bar 7*b* can be moved relative to the knife 7*a*. The gap between the knife 7*a* and the nose bar 7*b* can thus be adjusted. The knife assembly 35 is provided with electrically driven actuators for moving the nose bar 7*b*. The actuators can comprise, for example, ball screws and electric motors. By adjusting the gap between the knife 7*a* and the nose bar 7*b*, the thickness of the veneer can be controlled.

Figure 9:
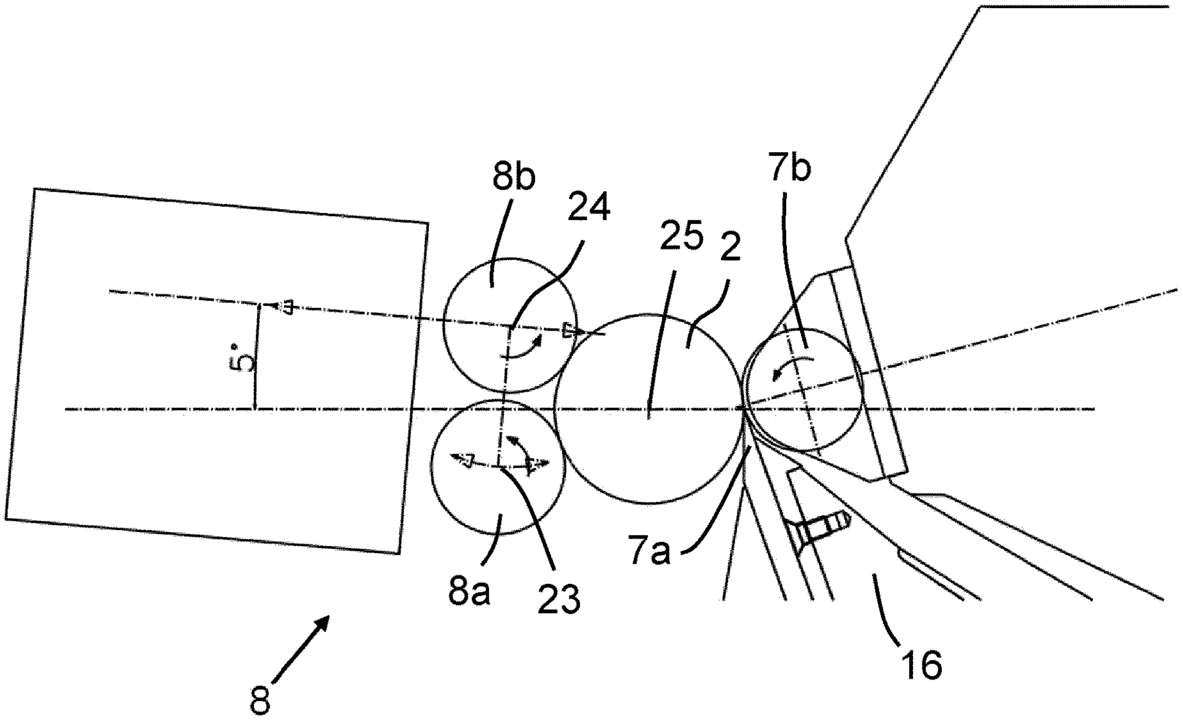
FIG. 9 shows a schematic view of a supporting device and part of the knife assembly of the lathe of FIG. 1.
Figure 10:
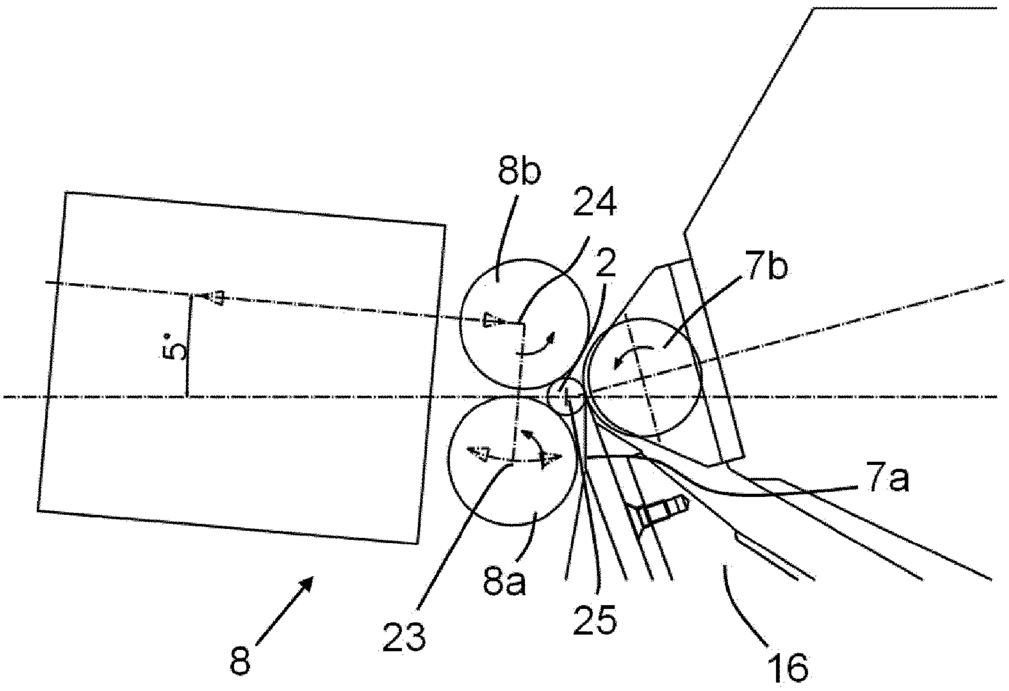
FIG. 10 shows another view of the supporting device and the knife assembly of FIG. 9.

During peeling, the block 2 is supported by means of a support device 8, which can be best seen in schematic FIGS. 9 and 10. The support device 8 comprises a lower roll 8*a* and an upper roll 8*b*. The rolls 8*a*, 8*b* can be referred to as backup rolls. In the embodiment of the figures, both rolls 8*a*, 8*b* have the same diameter. Both rolls 8*a*, 8*b* are rotatable. Both rolls 8*a*, 8*b* are also driven by a motor, such as an electric motor. Like the roller nose bar 7*b*, also the driven rolls 8*a*, 8*b* of the support device 8 facilitate good control of the rotation speed and centering of the block 2 in spindleless peeling. Because of the driven support rolls 8*a*, 8*b* and nose bar 7*b*, good control of the peeling process can be achieved without a need to use spiked discs for transmitting force to the block. A disadvantage of spiked discs is that they wear and therefore need to be replaced relatively often.

The distance between the lower roll 8*a* and the upper roll 8*b* of the support device 8 is fixed. In the horizontal direction, the upper roll 8*b* is closer to the rotation axis of the spindles 3 than the lower roll 8*a*. The support device 8 is arranged opposite to the knife assembly 35. The support device 8 is linearly moveable. As the diameter of the block 2 decreases during peeling, the support device 8 is moved to keep the rolls 8*a*, 8*b* in contact with the block 2. The support device 8 is moved linearly by means of one or more electrically driven linear actuators, which can comprise an electric motor and a ball screw. The support device 8 does not move along a horizontal path, but at a slight angle relative to the horizontal direction. The angle can be, for instance, in the range of 3-7 degrees. In the embodiment of the figures, the angle is 5 degrees. The moving direction is tilted so that as the support device 8 approaches the rotation axis of the spindles 3 it simultaneously descents. The lower roll 8*a* and the upper roll 8*b* form a support roll assembly. In a basic orientation of the support roll assembly, an imaginary plane coinciding with the rotation axis 23, 24 of the lower roll 8*a* and the upper roll 8*b* is perpendicular to the moving direction of the support device 8. In the embodiment of the figures, the upper roll 8*b* is configured to remain above the rotation axis 25 of the block 2 during peeling. Also the rotation axis 24 of the upper roll 8*b* thus remains above the rotation axis 25 of the block 2. During peeling, the rotation axis 23 of the lower roll 8*a* is below the rotation axis 25 of the block 2. However, as the support device 8 is moved backwards for bringing a new block to the peeling position, the rotation axis 23 of the lower roll 8*a* may move above the rotation axis 25 of the block 2.

The support roll assembly is rotatable about the rotation axis 24 of the upper roll 8*b*. The support roll assembly can be rotated +/−3 degrees from the basic orientation about the rotation axis 24 of the upper roll 8*b*. In the embodiment of the figures, the rotation of the support roll assembly of the support device 8 is carried out by means of an electric motor, a gear 29 and a toothed rack 30. However, also some other kind of actuating mechanism could be used. By means of the rotational movement of the support roll assembly, the spirally decreasing outer perimeter of the block 2 can be followed so that the axis of rotation of the block 2 does not move during spindleless peeling.

By arranging the moving direction of the support device 8 at an angle of 5 degrees in respect of the horizontal direction, the distance from the rolls 8*a*, 8*b* to the knife 7*a* and to the nose bar 7*b* is maximized. Also, a smaller rotation angle of the support roll assembly about the rotation axis 24 of the upper roll 8*b* is sufficient for compensating the effect of the spirally reducing diameter of the block 2 during peeling.

The lathe 1 further comprises a centering device 4 for centering the blocks for peeling and a transfer device 6 for moving the blocks from the centering device 4 to a peeling position.

Figure 2:
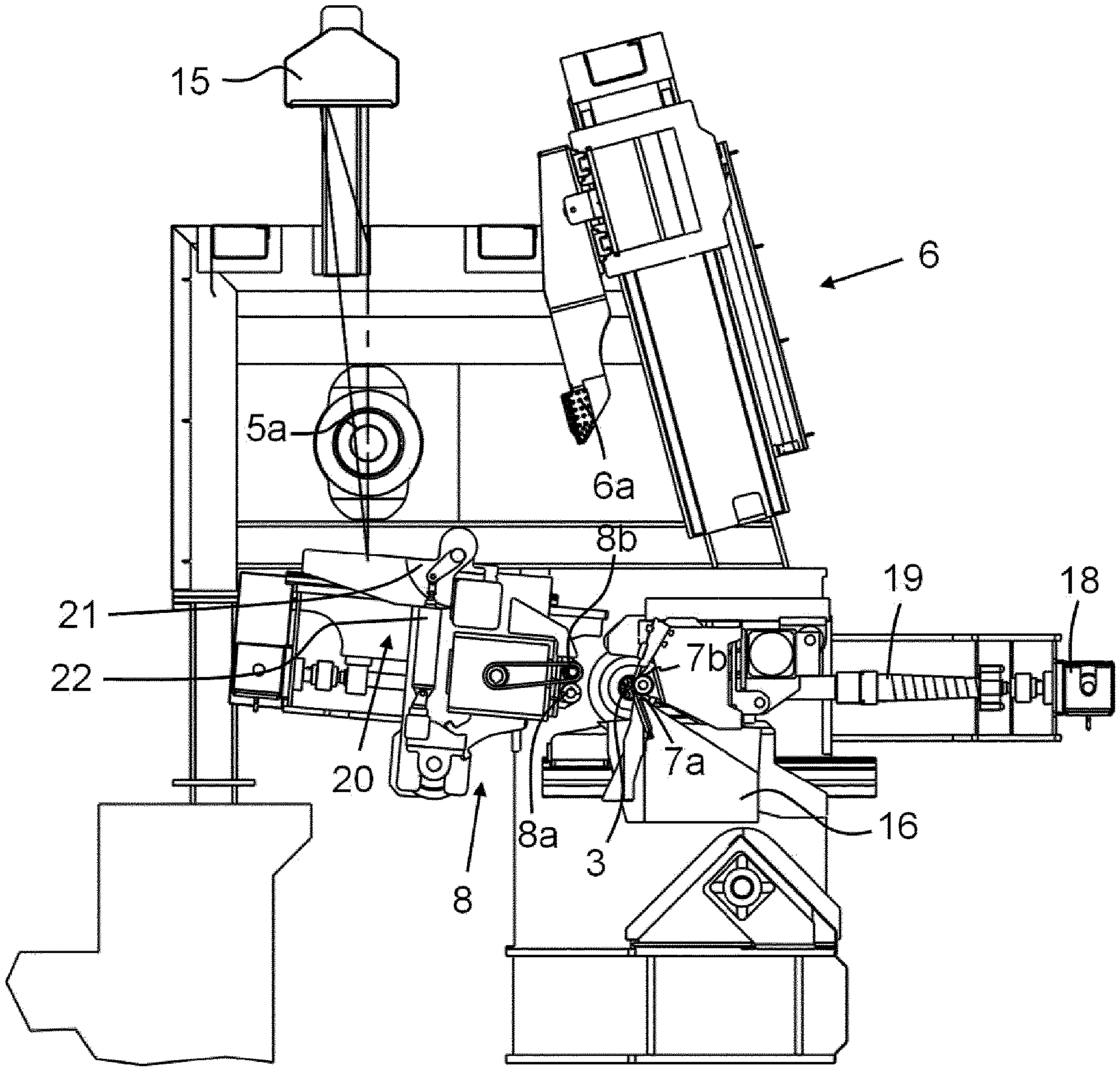
FIG. 2 shows a cross-sectional side view of the lathe of FIG. 1.
Figure 3:
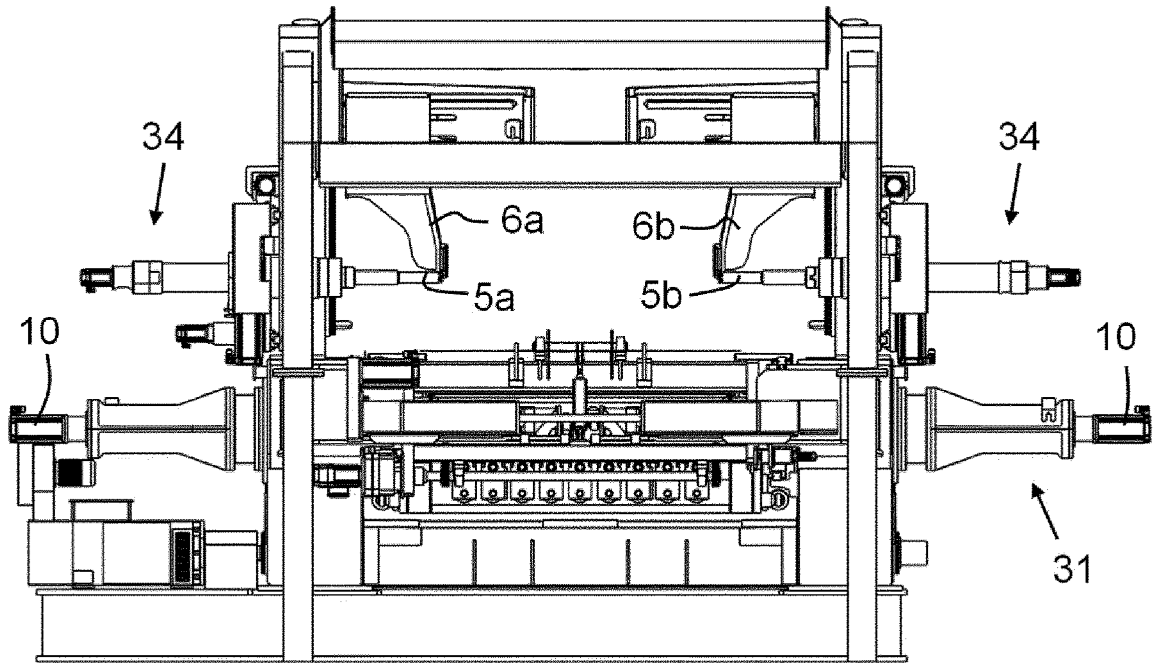
FIG. 3 shows a front view of the lathe of FIG. 1.
Figure 4:
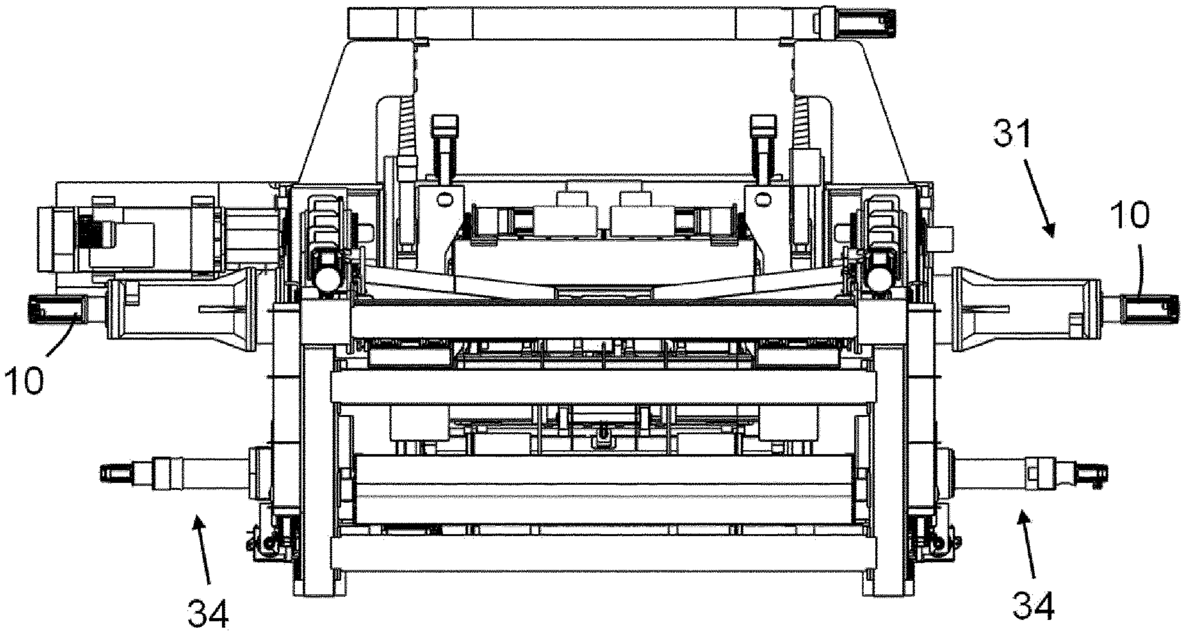
FIG. 4 shows a top view of the lathe of FIG. 1.

Details of the centering device 4 can be seen for example in FIGS. 2 and 3. The centering device 4 is configured to measure the block for determining optimal centering of the block for peeling. The blocks that are brought to the lathe 1 are not perfectly cylindrical, but the shape of the blocks varies. Optimal centering of a block could be defined so that the center axis of an imaginary cylinder that fits within the block and has the greatest possible diameter coincides with the center axis of the spindles 3 of the lathe 1. Optimal centering of the blocks ensures that the waste of wood material is as small as possible.

The centering device 4 comprises a measurement device 15. In the embodiment of the figures, the measurement device 15 is a laser scanner, but the measurement device could also be, for instance, some other kind of optical scanner or a scanner utilizing ultrasound for measuring the dimensions of the block. The centering device 4 further comprises a first centering spindle 5*a* for engaging the first end of the block and a second centering spindle 5*b* for engaging the second end of the block. Both centering spindles 5*a*, 5*b* are rotatable. The centering device 4 is further provided with at least one motor for rotating at least one of the centering spindles 5*a*, 5*b*. The block can thus be rotated between the centering spindles 5*a*, 5*b* and the measurement device 15 can measure the dimensions of the block. Instead of rotating the block between the centering spindles 5*a*, 5*b*, the measurement device 15 could be configured to move around the block for measuring the dimensions of the block.

The dimensions can be measured at several locations along the axial direction of the block and at several locations along the perimeter of the block. A web of measurement points is thus formed. The greater the number of the measurement points is, the better is the accuracy of the centering. The measurement device 15 is connected to a data processing unit, which is configured to calculate the location of an optimal rotation axis for the block. The measurement data is utilized when the block is moved from the centering device 4 to the peeling position. The center axis of the spindles 3 are arranged to coincide with the points where the optimal rotation axis intersects end surfaces of the block. The centering device 4 can comprise an auto-calibration function, which receives data from the peeling process and calibrates the centering device 4 on the basis of the data.

Each centering spindle 5*a*, 5*b* is configured to move in its axial direction for engaging the block between the centering spindles 5*a*, 5*b*. The lathe 1 is provided with an electrically driven linear actuator 34 for moving each centering spindle 5*a*, 5*b* in the axial direction. In addition, the centering spindles 5*a*, 5*b* are configured to move in the vertical direction and in a horizontal direction perpendicular to the axial direction of the centering spindles 5*a*, 5*b*. The centering device 4 is configured to move after the measurement of the block the first centering spindle 5*a* and the second centering spindle 5*b* in relation to each other in a plane that is perpendicular to the axial direction of the centering spindles 5*a*, 5*b*. The block is thus positioned in an optimal orientation for peeling. The centering device 4 is further configured to move the block towards transfer arms 6*a*, 6*b*, which transfer the block into a position between the spindles 3. The moving range of the centering spindles 5*a*, 5*b* is longer in the horizontal direction that is perpendicular to the axial direction of the centering spindles 5*a*, 5*b* than in the vertical direction. This allows moving the block close to the transfer arms 6*a*, 6*b* and over the support device 8 and a shorter moving range is thus required from the transfer arms 6*a*, 6*b*.

From the centering spindles 5*a*, 5*b* of the centering device 4, the block is gripped by means of the transfer arms 6*a*, 6*b*. A first transfer arm 6*a* is configured to engage the first end of the block and a second transfer arm 6*b* is configured to engage the second end of the block. Each transfer arm 6*a*, 6*b* is configured to move in a first direction, which corresponds to the axial direction of the spindles 3. By means of the movement of the transfer arms 6*a*, 6*b* in the first direction, a block can be gripped between the transfer arms 6*a*, 6*b*. Because the block is correctly oriented in the centering device 4, the transfer arms 6*a*, 6*b* do not have to adjust the orientation of the block. The block can thus be moved along a linear path to the spindles 3 of the lathe 1. However, the transfer arms 6*a*, 6*b* could be configured to allow further adjustment of the orientation of the block. For transferring the block, the transfer arms 6*a*, 6*b* move linearly in a second direction. The second direction is inclined relative to the vertical direction. The second direction can be, for example, at an angle of 10-20 degrees relative to the vertical direction. In the embodiment of the figures, the angle between the second direction and the vertical direction is 15 degrees. The angle between the horizontal direction and the second direction is thus 75 degrees. The second direction is tilted towards the centering device 4. As the transfer arms 6*a*, 6*b* move upwards from the spindles 3, they simultaneously move towards the centering spindles 5*a*, 5*b*. Because the transfer arms 6*a*, 6*b* move towards the centering device 4, the distance the centering spindles 5*a*, 5*b* are required to move towards the transfer arms 6*a*, 6*b* is shortened. On the other hand, because the second direction is close to the vertical direction, the support device 8 does not need to move over a long distance to make room for the movement of the transfer arms 6*a*, 6*b* and for the block moved by the transfer arms 6*a*, 6*b*.

The lathe 1 further comprises a feeder 20 for feeding blocks to spindleless peeling. The feeder 20 can be seen for example in FIGS. 2 and 5. The feeder 20 is attached to the support device 8. The feeder 20 thus moves together with the support device 8. The feeder 20 comprises a feeder arm 21, which is rotatable about a rotation axis. The feeder 20 further comprises an actuating device 22, which is configured to rotate the feeder arm 21 about the rotation axis. In the embodiment of the figures, the actuating device 22 comprises a cylinder. The cylinder can be a hydraulic cylinder or a pneumatic cylinder. Instead of the cylinder, the actuating device 22 could comprise an electrical actuator, such as an actuator comprising an electric motor and a ball screw. By means of the feeder 20, small diameter blocks that have been rounded in a separate rounding machine can be fed to a peeling position without the centering device 4 and the transfer arms 6*a*, 6*b*. This allows faster feeding of the blocks.

Figure 5:
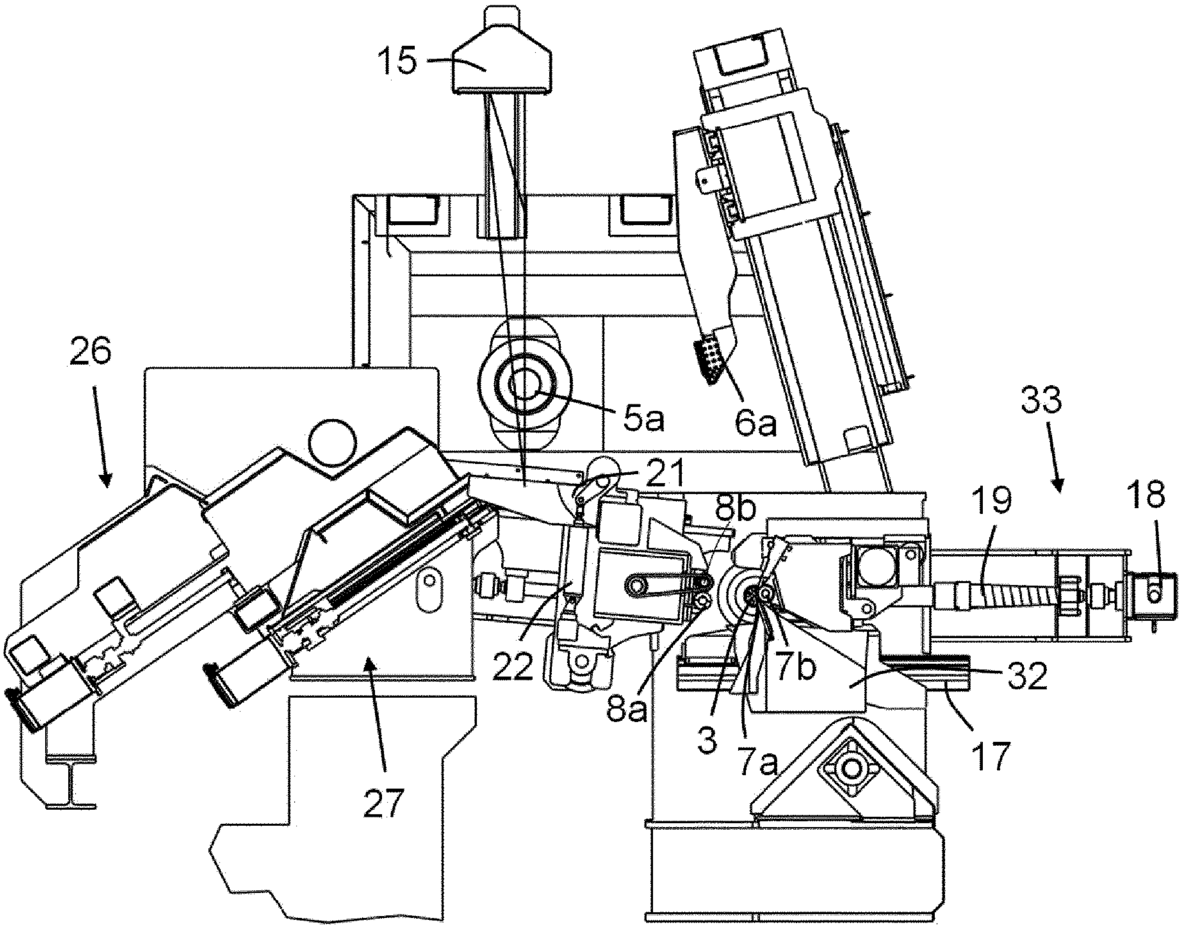
FIG. 5 shows a cross-sectional side view of the lathe of FIG. 1 with a block feeder and a linear loader.
Figure 6:
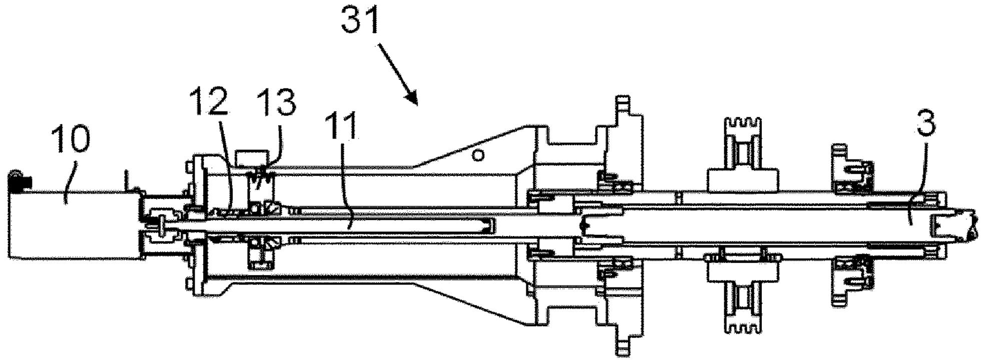
FIG. 6 shows a spindle of the lathe of FIG. 1.

The lathe 1 can form part of a veneer production line together with different auxiliary devices. FIG. 5 shows step feeder 26, which feeds blocks to a linear loader 27. The centering device 4 of the lathe 1 is configured to retrieve the blocks from the linear loader 27 by means of the centering spindles 5*a*, 5*b*.

It will be appreciated by a person skilled in the art that the invention is not limited to the embodiments described above, but may vary within the scope of the appended claims.

The invention claimed is:

1. A veneer lathe for producing veneer from blocks by peeling, the veneer lathe being configured for both spindle peeling and spindleless peeling, wherein the veneer lathe comprises

- a first set of spindles comprising at least one spindle that is moveable in the axial direction of the spindle for engaging a first end of a block and a second set of spindles comprising at least one spindle that is moveable in the axial direction of the spindle for engaging a second end of the block, the spindles being rotatable and configured to hold the block in a peeling position in spindle peeling and to transmit to the block torque needed for rotating the block,
- a centering device, which is configured to measure dimensions of the block for determining optimal centering of the block between the first set of spindles and the second set of spindles in spindle peeling, the centering device comprising a first centering spindle that is moveable in its axial direction for engaging the first end of the block and a second centering spindle that is moveable in its axial direction for engaging the second end of the block,
- a first transfer arm that is moveable in the axial direction of the spindles for engaging the first end of the block and a second transfer arm that is moveable in the axial direction of the spindles for engaging the second end of the block, the transfer arms being further configured to be moveable in a direction that is perpendicular to the axial direction of the spindles for transferring the block from the centering device to the peeling position for spindle peeling, a knife assembly that is moveable in a direction that is perpendicular to the axial direction of the spindles and comprises a knife for cutting the veneer and a nose bar, which is in the form of a rotatable roll, and a support device comprising a rotatable lower roll and a rotatable upper roll, which is arranged at a distance from the lower roll in a radial direction of the lower roll, the rolls being configured to support the block during peeling, wherein the distance between the lower roll and the upper roll of the support device is fixed and the rolls form an assembly that is configured to be rotatable about the rotation axis of the upper roll.

2. The veneer lathe according to claim 1, wherein the first centering spindle and the second centering spindle are movable independently from each other in a first direction that is perpendicular to the axial direction of the centering spindles and in a second direction that is perpendicular to the axial direction of the centering spindles and to the first direction for allowing centering of the block before transferring the block to the peeling position for spindle peeling.

3. The veneer lathe according to claim 1, wherein the first transfer arm and the second transfer arm are configured to move linearly for transferring the block from the centering spindles of centering device to the peeling position.

4. The veneer lathe according to claim 3, wherein the moving direction of the transfer arms is inclined 10-20 degrees from the vertical direction towards the centering device.

5. The veneer lathe according to claim 1, wherein the support device is configured to be moveable linearly in a direction that is at an angle of 3-7 degrees relative to the horizontal direction so that the support device descents as it moves towards the spindles.

6. The veneer lathe according to claim 1, wherein the lathe comprises an electrically driven linear actuator for moving each spindle in the axial direction of the spindle.

7. The veneer lathe according to claim 1, wherein the lathe comprises an electrically driven linear actuator for moving each centering spindle in the axial direction of the centering spindle.

8. The veneer lathe according to claim 1, wherein the lathe comprises one or more electric motors that are configured to drive the nose bar and the rolls of the support device.

9. The veneer lathe according to claim 1, wherein the support device is provided with a feeder that is configured to trans-fer blocks to spindleless peeling without the use of the centering device and the transfer arms.

10. The veneer lathe according to claim 9, wherein the feeder comprises a rotatable feeder arm and an actuating device configured to actuate the feeder arm.

11. A method of producing veneer from a block by means of a veneer lathe according to any one of the preceding claims, the method comprising the steps of bringing a block to the lathe, rotating the block in the lathe, and peeling veneer from the block by means of the knife.

12. The method according to claim 11, wherein the method comprises the steps of determining dimensions of the block by means of the centering device, based on the dimensions of the block, centering the block into an optimal orientation, and transferring the block by means of the transfer arms to a peeling position between the spindles.

13. The method according to claim 11, wherein the method comprises the steps of rotating the block by means of the spindles and peeling the block until the block reaches a first predetermined diameter, retracting the spindles and continuing the peeling without the spindles until the block reaches a second predetermined diameter.

14. The method according to claim 11, wherein the block is positioned into an optimal orientation by means of the centering spindles of the centering device, and the block is transferred into a peeling position by means of a linear movement of the transfer arms.

15. The method according to claim 11, wherein the block is brought into a peeling position for spindleless peeling without the use of the centering spindles and the transfer arms.

16. The method according to claim 11, wherein an assembly comprising the lower roll and the upper roll is rotated about the rotation axis of the upper roll during peeling.

17. The method according to claim 11, wherein the lower roll and the upper roll of the support device and the nose bar are electrically driven during peeling.

* * * * *